(12) United States Patent
Hlady et al.

(10) Patent No.: US 11,543,080 B2
(45) Date of Patent: Jan. 3, 2023

(54) AUTOMATED PIPELINE CONSTRUCTION MODELLING

(71) Applicant: LUX MODUS LTD., Calgary (CA)

(72) Inventors: Joseph Hlady, Calgary (CA); Matthew Glanzer, Calgary (CA); Lance Fugate, Calgary (CA); Nehla Ghouaiel, Edmonton (CA); Rachel Legesse, Edmonton (CA); Siamak Akhlaghi Esfahany, Edmonton (CA)

(73) Assignee: LUX MODUS LTD., Calgary (CA)

( * ) Notice: Subject to any disclaimer, the term of this patent is extended or adjusted under 35 U.S.C. 154(b) by 509 days.

(21) Appl. No.: 16/615,381

(22) PCT Filed: May 23, 2018

(86) PCT No.: PCT/CA2018/050603
§ 371 (c)(1),
(2) Date: Nov. 20, 2019

(87) PCT Pub. No.: WO2018/213927
PCT Pub. Date: Nov. 29, 2018

(65) Prior Publication Data
US 2020/0158290 A1 May 21, 2020

Related U.S. Application Data

(60) Provisional application No. 62/509,895, filed on May 23, 2017.

(51) Int. Cl.
*G01S 17/42* (2006.01)
*G01S 17/89* (2020.01)
(Continued)

(52) U.S. Cl.
CPC .............. *F17D 5/00* (2013.01); *G01S 7/4813* (2013.01); *G01S 17/42* (2013.01); *G01S 17/89* (2013.01); *G01S 19/42* (2013.01)

(58) Field of Classification Search
CPC .......... F17D 5/00; G01S 7/4813; G01S 17/42; G01S 17/89; G01S 19/42; G01S 7/003;
(Continued)

(56) References Cited

U.S. PATENT DOCUMENTS 6,847,462 B1 * 1/2005 Kacyra ................ G01B 11/002
356/601
9,230,453 B2 * 1/2016 Van Sickle ............ G01C 11/02
(Continued)

FOREIGN PATENT DOCUMENTS

CN 106446455 B * 5/2018
WO WO 2002/082181 A1 10/2002

OTHER PUBLICATIONS

PCT International Search Report & Written Opinion, International Application No. PCT/CA2018/050603, dated Jul. 20, 2018, 13 Pages.

*Primary Examiner* — Peter D Nolan
*Assistant Examiner* — Anwar Mohamed
(74) *Attorney, Agent, or Firm* — Fenwick & West LLP

(57) ABSTRACT

Methods and systems for modelling pipeline construction, include or implement steps of (a) obtaining ranging data of a pipeline construction location including a pipe; (b) processing the ranging data to produce a spatially organized point cloud; and (c) processing the point cloud to identify at least one geometric feature comprising a point or a two-dimensional feature representative of a pipe centreline, and associating the at least one geometric feature with the pipeline construction location. The ranging data may be data obtained from a lidar device. The pipeline construction may be underground construction, where pipe is laid in a ditch. Relevant information, such as depth-of-cover may be calculated from identified geometric features. Relevant information may be determined in real-time or near-real-time and displayed, communicated or recorded as desired.

17 Claims, 15 Drawing Sheets

(51) Int. Cl.
*G01S 19/42* (2010.01)
*F17D 5/00* (2006.01)
*G01S 7/481* (2006.01)

(58) Field of Classification Search
CPC ........ G01S 7/4802; G01S 7/481; G01S 17/86;
G01C 15/002
See application file for complete search history.

(56) References Cited

U.S. PATENT DOCUMENTS

| | | | |
|---|---|---|---|
| 9,324,003 B2 | 4/2016 | France et al. | |
| 9,384,399 B2 | 7/2016 | Bangay | |
| 10,387,018 B2* | 8/2019 | Bellett | G06T 17/05 |
| 10,928,299 B2* | 2/2021 | Gluskin | F16L 58/00 |
| 11,175,099 B2* | 11/2021 | Rajagopalan | F28D 7/0008 |
| 2012/0091185 A1* | 4/2012 | Ume | B23K 9/173 |
| | | | 228/1.1 |
| 2013/0243250 A1* | 9/2013 | France | G06V 10/40 |
| | | | 382/103 |
| 2014/0316837 A1* | 10/2014 | Fosburgh | G06Q 10/06312 |
| | | | 705/7.22 |
| 2016/0071059 A1* | 3/2016 | Petering | G06Q 10/103 |
| | | | 705/301 |
| 2016/0167153 A1* | 6/2016 | Denis | B23K 9/167 |
| | | | 219/132 |
| 2017/0182605 A1* | 6/2017 | Rajagopalan | B23K 37/003 |
| 2017/0274467 A1* | 9/2017 | Rajagopalan | B23K 9/1087 |
| 2017/0299757 A1* | 10/2017 | Bench | G01V 3/10 |
| 2022/0108262 A1* | 4/2022 | Celia | G05B 19/41885 |

\* cited by examiner

AUTOMATED PIPELINE CONSTRUCTION MODELLING

CROSS-REFERENCE TO RELATED APPLICATIONS

This application claims priority to U.S. Provisional Patent Application U.S. 62/509,895 filed on May 23, 2017, the entire contents of which are incorporated herein by reference, where permitted.

FIELD OF THE INVENTION

The present invention relates generally to methods and systems for mapping or modelling pipeline construction, including above-ground and underground construction, using ranging technology.

BACKGROUND OF THE INVENTION

Pipeline construction conventionally involves trenching, where a narrow ditch is dug, the pipeline placed within the ditch, and the ditch is filled in with soil, which is typically the soil which was displaced when digging the ditch. Above-ground pipeline construction of course does not require trenching, but may still require monitoring and reporting of the position of the pipeline as it is being constructed.

Many jurisdictions regulate pipeline construction by stipulating minimum depth-of-cover, which is the distance from the pipeline to the top edge of the ditch. Pipeline construction companies must dig adequately deep ditches to ensure the minimum depth-of-cover is met. Conventionally, a surveyor manually surveys each location prior to the pipe being lowered into the ditch. The depth-of-cover is calculated manually and visually using different tap measures and leveling instruments such as a theodolite. This approach relies heavily on human judgment. As a result, it is vulnerable to significant human error. Furthermore, workers must be on-site and often place themselves in physically vulnerable or dangerous positions to obtain the required information.

Additionally, with this conventional method, near real-time data processing is not available. Generally, in such types of construction, time is of the essence in respect of collecting and processing this data. Using conventional methods usually results in delays in data processing and realization of results, as well as introduces opportunities for the corruption or loss of collected data.

There is a need in the art for systems or methods of obtaining desired data which may mitigate some or all of the difficulties posed in the prior art, by automating at least a portion of the process and reducing human intervention.

SUMMARY OF THE INVENTION

In one aspect, the present invention comprises a method of modelling pipeline construction, comprising the steps of:

(a) obtaining ranging data of a pipeline construction location including a pipe;

(b) processing the ranging data to produce a spatially organized point cloud; and (c) identifying at least one geometric feature comprising a point or a two-dimensional feature representative of a pipe centreline, and associating the at least one geometric feature with the pipeline construction location.

In one embodiment, the pipeline construction location is identified with Global Navigation Satellite System (GNSS) data. In one embodiment, the ranging data is data which is produced by scanning the pipeline construction location using lidar. A lidar device may be mounted to a mobile platform which travels longitudinally adjacent the ditch, collecting data as it travels. The lidar device may be mounted on a boom to be positioned above the pipeline, preferably directly above the pipeline.

In some embodiments, the pipeline construction is underground construction, which involves creating a ditch. The method may then include the steps of identifying one or more geometric features of the ditch, which may include one or both top edges, and/or one or both bottom edges of the ditch.

In some embodiments, the spatially organized point cloud is processed to produce a digital elevation model of the pipeline and/or ditch. The point cloud may contain absolute or relative geolocation information. The pipe centreline and/or the at least one geometric feature may be extracted from the digital elevation model. The at least one geometric feature may be used to calculate certain dimensions of the ditch and/or the pipeline, and further the relative position of the pipeline within the ditch. In particular, the "depth-of-cover" or DOC may be determined, which is the difference in elevation between the pipe centreline at a given longitudinal position and an imaginary line which intersects both upper edges of the ditch at the same longitudinal position.

In alternative embodiments, the ranging data may be processed by applying a raster transformation, producing a raster dataset which comprises an elevation of each of a plurality of points along a transverse plane which intersects a longitudinal axis of the ditch, representing a cross-sectional profile of the ditch and the pipeline, if present.

In some embodiments, the point cloud is processed to produce a digital elevation model and a raster dataset, wherein the raster dataset is used to determine the at least one geometric feature substantially in real-time and the digital elevation model is used to determine the at least one geometric feature in near-real-time. The two determinations may be used to improve the overall accuracy of the determination.

In some embodiments, the at least one geometric feature may be displayed or communicated in real-time, or near-real time to a user or a data recording system, which may be situated in a remote location from the pipeline construction location.

In another aspect, the invention comprises a computer-implemented system for determining at least one geometric feature of a pipeline construction location, the system configured to receive ranging data from at least one ranging unit configured to be positioned above the pipeline construction location, the system comprising a processor and at least one memory device in communication with the processor, the memory comprising processor-executable instructions to (a) process the ranging data to produce a spatially organized point cloud; and (b) extract the at least one geometric feature which comprises a point or two-dimensional linear contour representative of a pipeline centreline, from the point cloud.

In one embodiment, the system further comprises a display/report module which stores a record of the at least one geometric feature correlated to a geographic position, or reports the at least one geometric feature correlated to a geographic position to a remote user or system, or both.

BRIEF DESCRIPTION OF THE DRAWINGS

In the drawings shown in the specification, like elements may be assigned like reference numerals. The drawings may not be to scale, with the emphasis instead placed upon the principles of the present invention. Additionally, each of the embodiments depicted are but one of a number of possible arrangements utilizing the fundamental concepts of the present invention.

DETAILED DESCRIPTION OF EMBODIMENTS OF THE INVENTION

In general, the methods and systems described herein may be used to collect, store and/or display data useful for pipeline construction, and underground pipeline construction, in particular. This data is collected in real-time or near-real time, while the pipe is being placed so no translation and location estimating is needed. In some embodiments, in-ditch pipeline data models may be generated using this collected data. The data may collected autonomously or semi-autonomously, requiring little or no human intervention or interpretation of data. Thus, the possibility of human error or misjudgment is reduced, in addition to the potential for increased speed of data collection.

Definitions. Any term or expression not expressly defined herein shall have its commonly accepted definition understood by a person skilled in the art. As used herein, the following terms have the following meanings.

A "ranging" technology is one which uses light, sound or electromagnetic energy to determine the distance between an emitting device and an object which reflects or returns the energy. One ranging technology comprises "LiDAR" or "lidar", which is a commonly used acronym for "light detection and ranging". Lidar conventionally uses a laser device that ranges using laser beam and a sensor which measures reflected pulses.

A "computer processor" or "processor" refers to an electronic device that is capable of processing an input electronic signal to produce an output electronic signal. In embodiments, a computer processor may include one or more devices commonly referred to as a programmable logic controller, a printed circuit board, an integrated circuit, a microcontroller, or the like. A "computing device" comprises at least one computer processor and typically includes computer-readable memory for storing instructions executable by the processor.

"Non-transitory computer-readable memory" refers to a tangible medium capable of storing data and/or instructions in a format readable by a computer processor. In embodiments, a non-transitory computer-readable memory may include magnetic media, optical media, or solid-state media.

In either above-ground or underground pipeline construction, the top of pipe is an important feature to identify for various purposes. Assuming the pipeline has a circular cross-section, the top of pipe is coincident with the longitudinal centreline of the pipeline.

Figure 1:
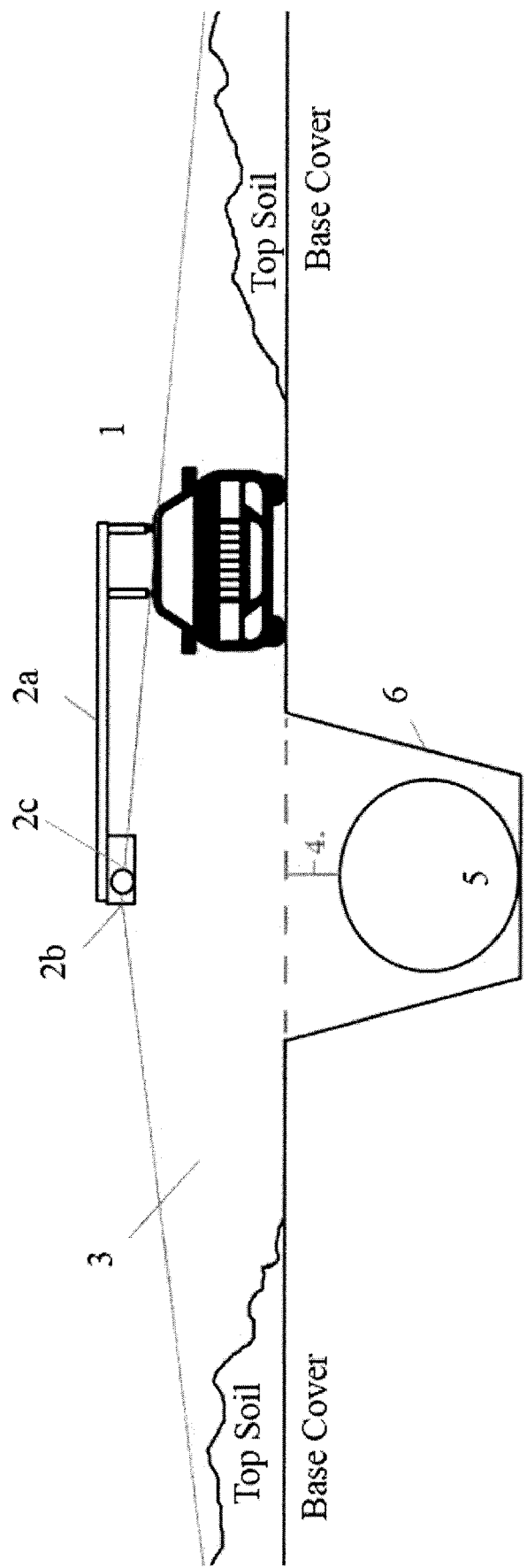
FIG. 1 shows a schematic cross-section of a pipeline construction ditch with one embodiment of a system of the present invention illustrated adjacent the ditch.

FIG. 1 shows a schematic cross-section of a pipeline right-of-way (ROW), showing a mobile platform 1, such as a data collection vehicle positioned immediately adjacent to a ditch 6. The vehicle has a ranging device 2 which in this case is a collection platform 2b positioned on a collection boom 2a. The collection platform 2b may comprise a lidar unit 2c which preferably has a wide field of view 3, to not only include the ditch, but also the ROW including displaced soil. A pipeline 5 is shown placed in the bottom of the ditch. The ditch has numerous geometric features, including various dimensions and angles. Important geometric features include one or both top edges of the ditch, as well as one or both bottom edges of the ditch. Identifiable geometric features may be used to determine or calculate other geometric features, such as DOC.

Although the example system shown in FIG. 1 depicts the collection of data in respect of a pipeline in a ditch, it is understood that systems of the present invention may be utilized in various other construction contexts, such as powerline data collection and modelling.

In the example shown, a collection platform 2b is mounted to a positioning arm/collection boom 2a, which is mounted to the mobile platform 1. A counter weight may be mounted to the positioning arm/collection boom 2a suitable to balancing the weight of the positioning arm/collection boom 2a. In some embodiments, the positioning arm/collection boom 2a is movable and can be positioned in different configurations to ensure that data around the ROW is captured as desired, and that the collection platform can be located at NADIR above the pipeline ditch or in a suitable configuration for data collection. It is a feature of some embodiments that the collection platform 2b may be positioned directly above the pipeline for data collection.

In some embodiments, the mobile platform 1 is not necessarily a vehicle, but is a robotic ground-based or aerial platform, that may be remotely controlled, or any other suitable ground-based mobile platform that is capable of traversing the terrain of the pipeline construction area.

The collection platform 2b comprises a lidar device 2c and associated hardware components, such as a laser device/source 2c, a sensor (e.g., photodetector and/or receiver) (not shown), a scanning or flashing device (not shown) which may allow either or both lidar scanning or flashing, a camera such as an RGB camera 23, at least one processor 25 and at least one memory device 27 (such as data storage 27 in the depicted example embodiment) in communication with the processor. In some embodiments, the vehicle 1 or the collection platform 2b further comprises a geospatial positioning system (GNSS) device 29 and antenna. An inertial measurement unit or IMU 31 may work in conjunction with the GNSS device to provide location information as the collection platform 2b is moved. A battery 33 may provide backup or primary power to the system, as required. A communications module 35 may provide a wireless network connection, such as by WiFi, cellular data, Bluetooth™ or the like. All these components may be connected to the processor 25 as is well known in the art.

In some embodiments, at least one or both of the processor and the memory device are remote from other components of the collection platform 2b. They may reside on the mobile platform, or may reside in a remote location entirely. The memory device stores processor-executable instructions for performing embodiments of methods described herein, and the processor is configured to execute at least those instructions. In some embodiments, the collection platform 2b is configured to collect lidar data, preferably in high definition (HD).

The collection platform 2b may be configured to communicate with other devices, remote from the collection platform 2b (or any of the devices that the collection platform 2b is comprised of) via any suitable mode of communication (e.g., wired or wireless communication links, or any suitable combination thereof).

The processor comprises any suitable processor, or combination of processors, including but not limited to a microprocessor, a central processing unit (CPU) and the like. Other suitable processing units are within the scope of present implementations.

The at least one memory device can comprise any suitable memory device, including but not limited to any suitable one of, or combination of, volatile memory, non-volatile memory, random access memory (RAM), read-only memory (ROM), hard drive, optical drive, flash memory, magnetic computer storage devices (e.g. hard disks, floppy disks, and magnetic tape), optical discs, and the like. Other suitable memory devices are within the scope of present implementations.

As executed by the processor, those instructions enable the processor to determine at least one geometric feature of a ditch, by obtaining lidar data of a ditch location, processing the lidar data to produce a spatially organized point cloud, and extracting at least one geometric feature from the point cloud and associating the at least one geometric feature with the ditch location. In one embodiment, the ditch location is identified with GNSS data.

In one preferred embodiment, a plurality of geometric features are identified and determined, such that a "digital twin" of the pipeline asset and construction process is created. A digital twin is recognized by those skilled in the art to be a digital replica of a physical asset, process or system, which may be used for various purposes. In the present case, digital imagery may be combined with the geometric features to produce a digital twin, or a substantial portion of a digital twin.

In some embodiments, the system may recognize the pipeline 5 and ditch geometry and, in some embodiments, automatically identify or calculate a geometric feature such as the pipeline centreline and/or the DOC and transmits it for display on a screen (e.g., via a graphical user interface (GUI)) in real-time or near-real-time. In addition, or alternatively, the feature(s) may be written directly to a receiving application or database, either locally or after transmission to a remote location. In some embodiments, the GUI displays the desired collected data such as geographic location (which may be described by latitude, longitude, and the like), DOC and elevation. The GUI may be a display on a user's electronic device, such as a computer, a mobile/portable computing device or other suitable device. For example, the GUI may be a display on any suitable combination of portable electronic devices, mobile computing device, portable computing devices, tablet computing devices, laptop computing devices, PDAs (personal digital assistants), cellphones, smartphones and the like. Other suitable portable electronic devices are within the scope of present implementations.

Figure 11A:
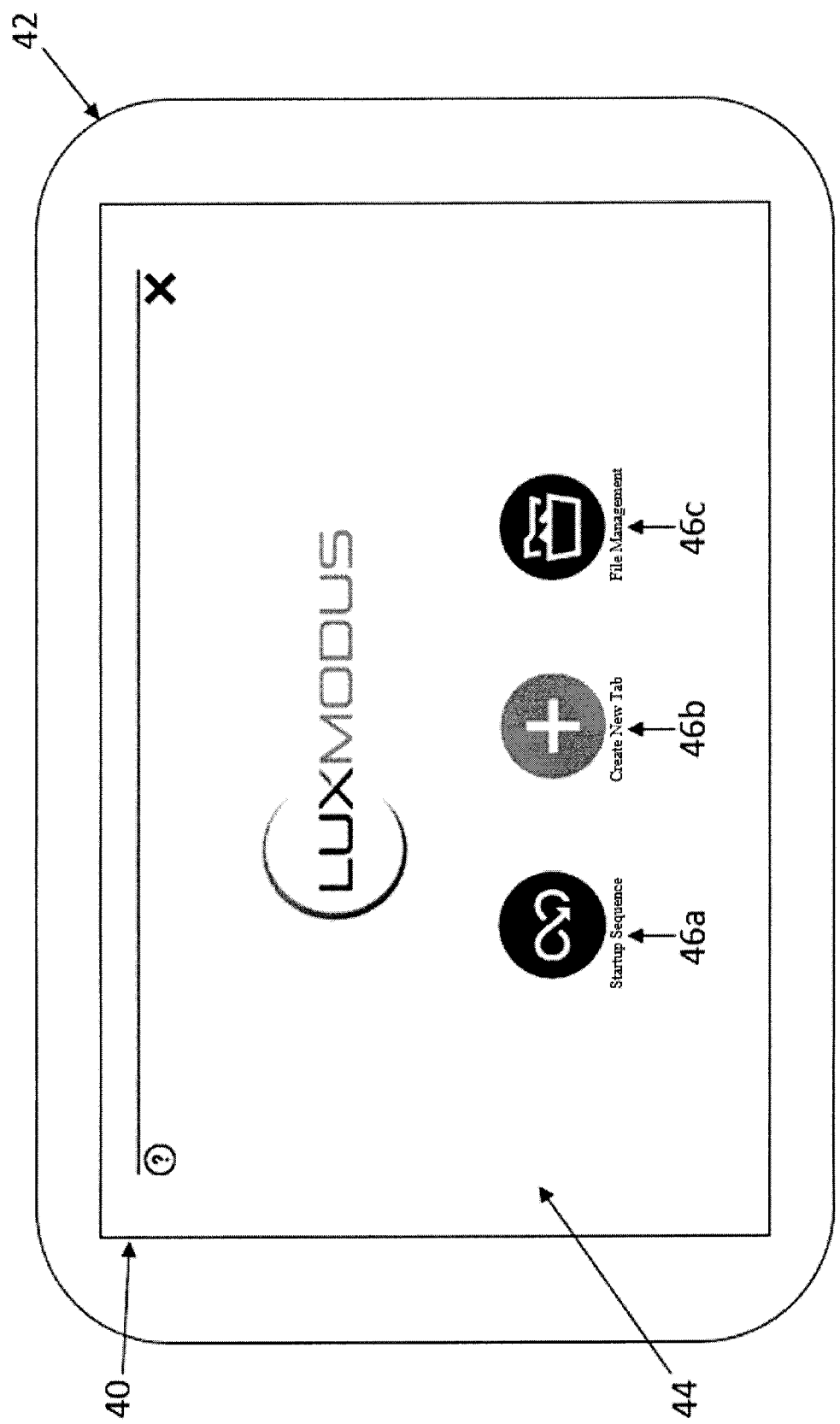
FIGS. 11A to 11E depict various windows of an example Graphical User Interface (GUI), according to embodiments of the systems and methods of the present invention.
Figure 11B:
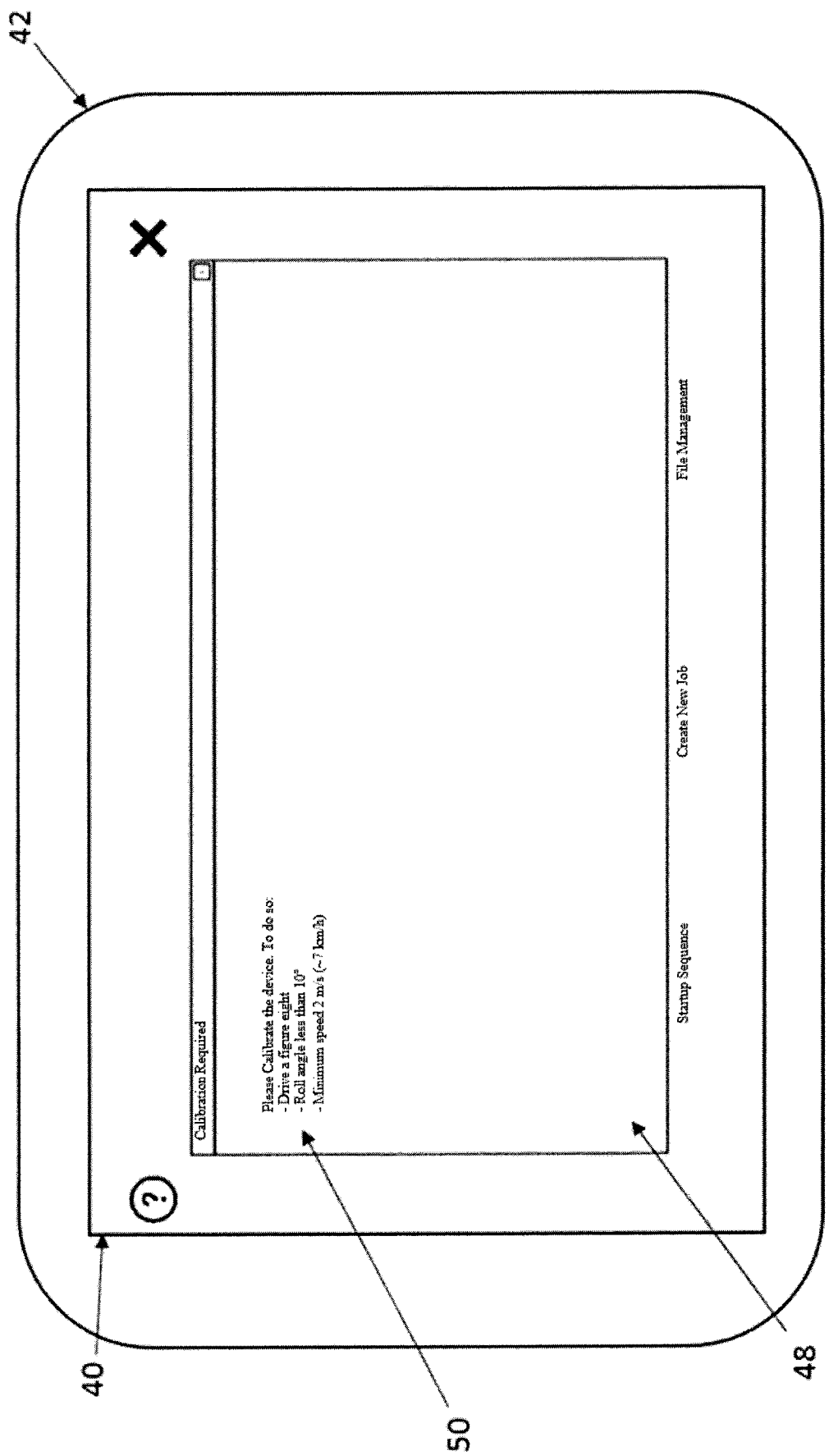
Figure 11C:
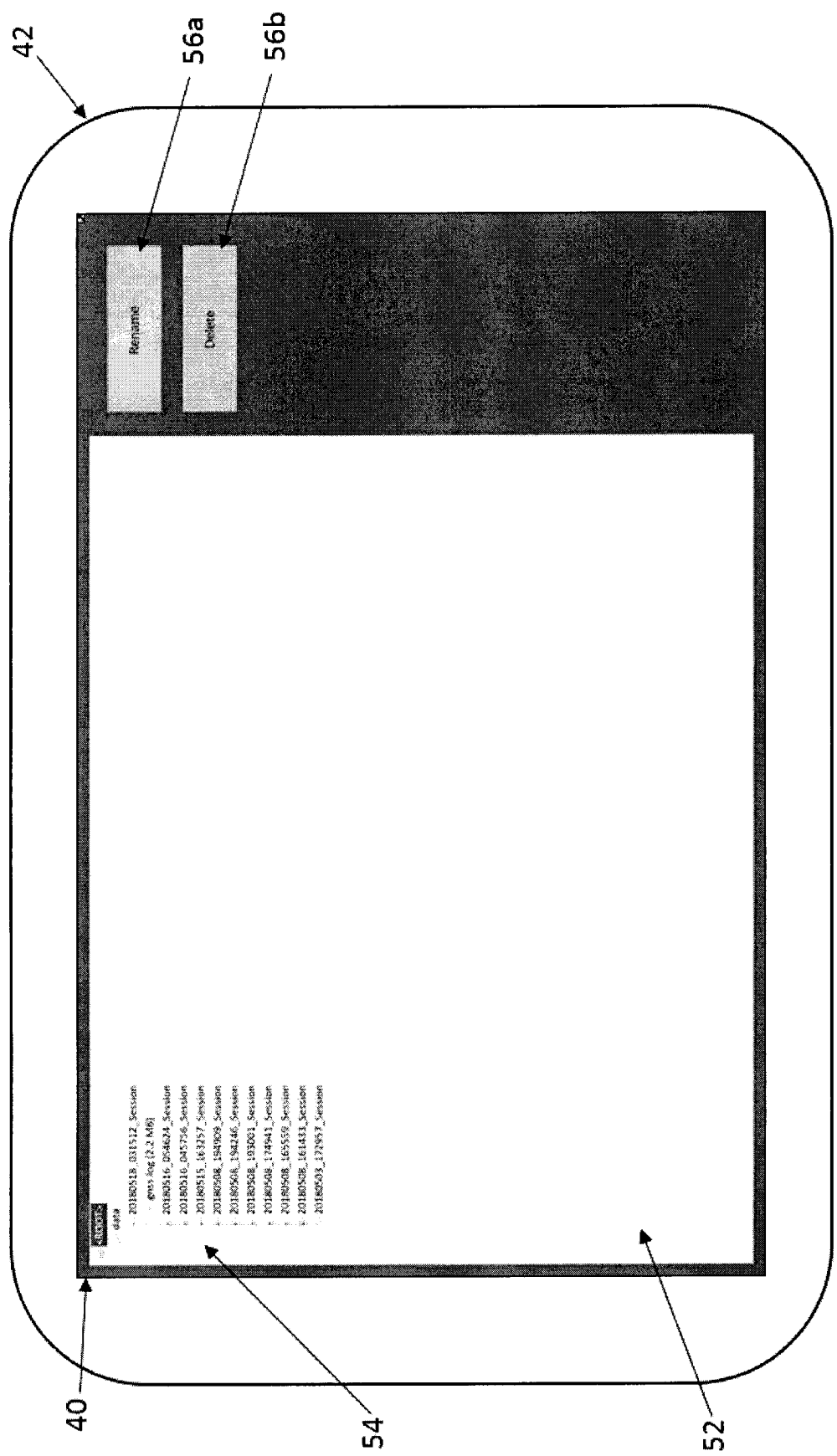
Figure 11D:
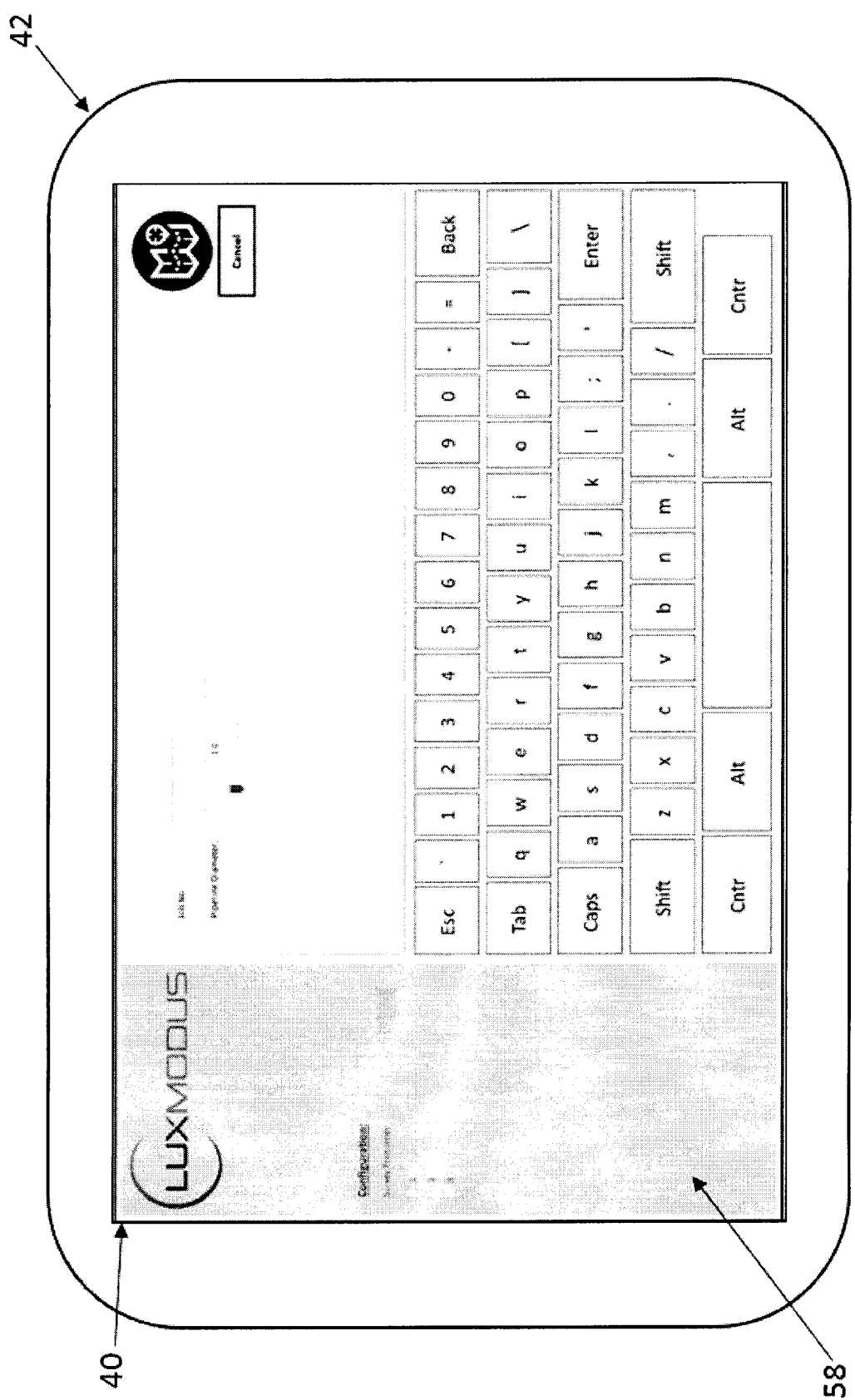
Figure 11E:
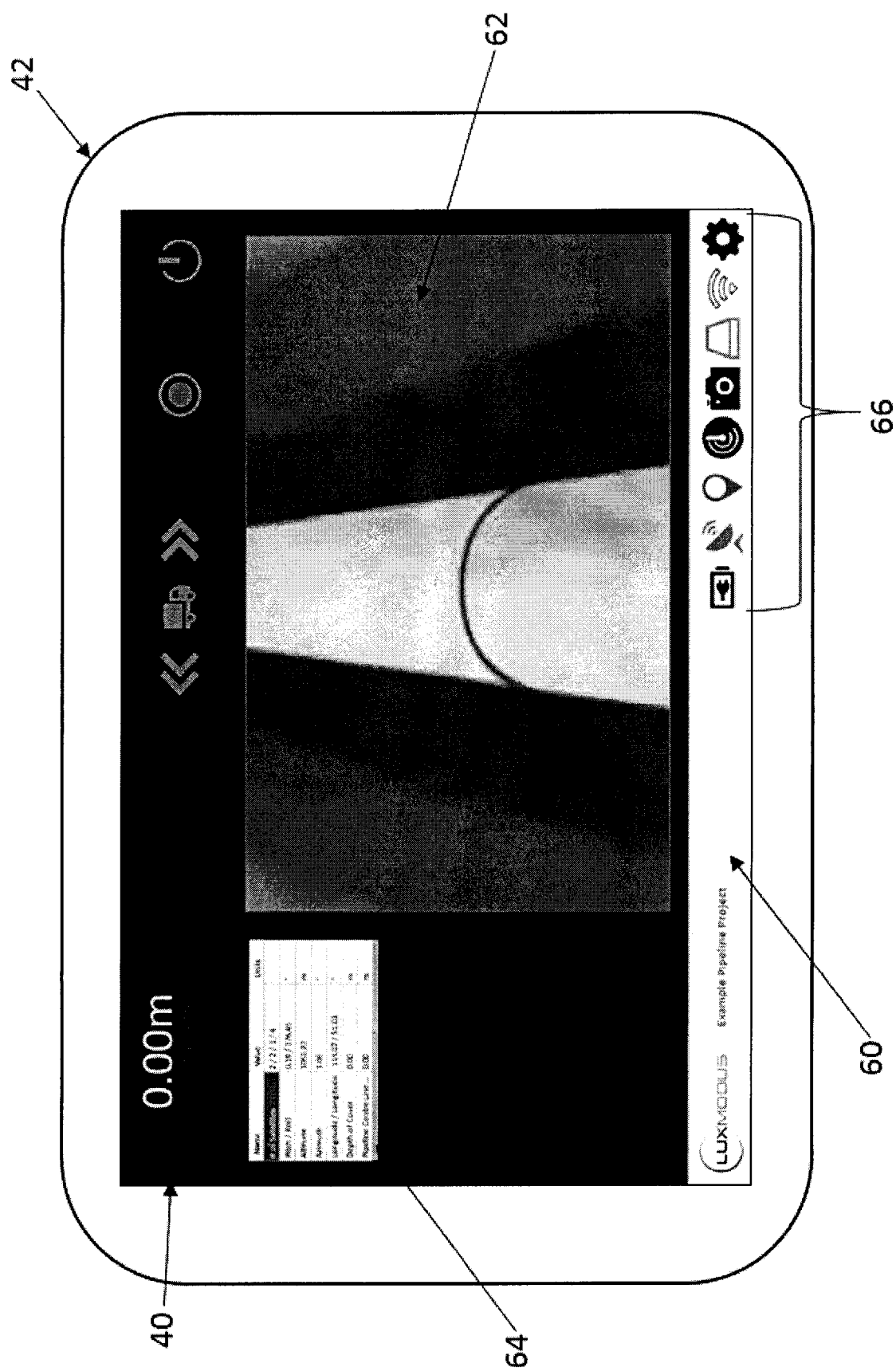

Attention is directed to FIGS. 11A to 11E, which depict examples of a GUI 40 as displayed on a portable electronic device 42, according to some embodiments. In FIG. 11A, an initial window 44 includes icons 46a, 46b and 46c associated with various high-level tasks (e.g., to startup a sequence, create a new job and/or manage files from previous jobs). FIG. 11B depicts a calibration window 48 of the GUI 40 which displays a notification 50 providing instructions on how to calibrate the system for determining at least one geometric feature of a pipeline construction location described herein, such as mobile platform 1. FIG. 11C depicts a file directory window 52 of the GUI 40. The file directory window 52 may display a root file tree 54 in which various files can be located by selecting drop down links. The file directory window may also include icons 56a and 56b to enable various file operations, such as renaming and/or deleting files. FIG. 11D depicts a records and reports window 58 which enables the creation and/or editing of comments for each job. FIG. 11E depicts a project window 60 in which the present field of view and the associated calculations, such as the DOC, are shown (at display portions 62 and 64, respectively). The project window 60 also displays various icons 66, which may indicate the status of various elements, such as battery life, location and connectivity, and enable the modification of various system settings, among other things.

Those instructions also enable the at least one processor to, in some embodiments, format the raw data collected by the lidar unit for feature extraction and modelling of data in a geospatial platform.

In some embodiments, the lidar data may be processed to generate detailed information and subsequent data sets for the pipe in the ditch. Geotagged imagery of the pipe in the ditch may be obtained from a camera. In some embodiments, a 3-dimensional (3D) vector model of the pipeline geometry is generated by the at least one processor based on the collected data. In some embodiments, a weld location database in 3D format may be generated, optionally with supporting imagery. In some embodiments, a web-viewable and geographic information system (GIS)-ready 3D model of the in-ditch pipeline is generated by the processor based on the collected data, and provided to a user and/or stored.

Figure 2:
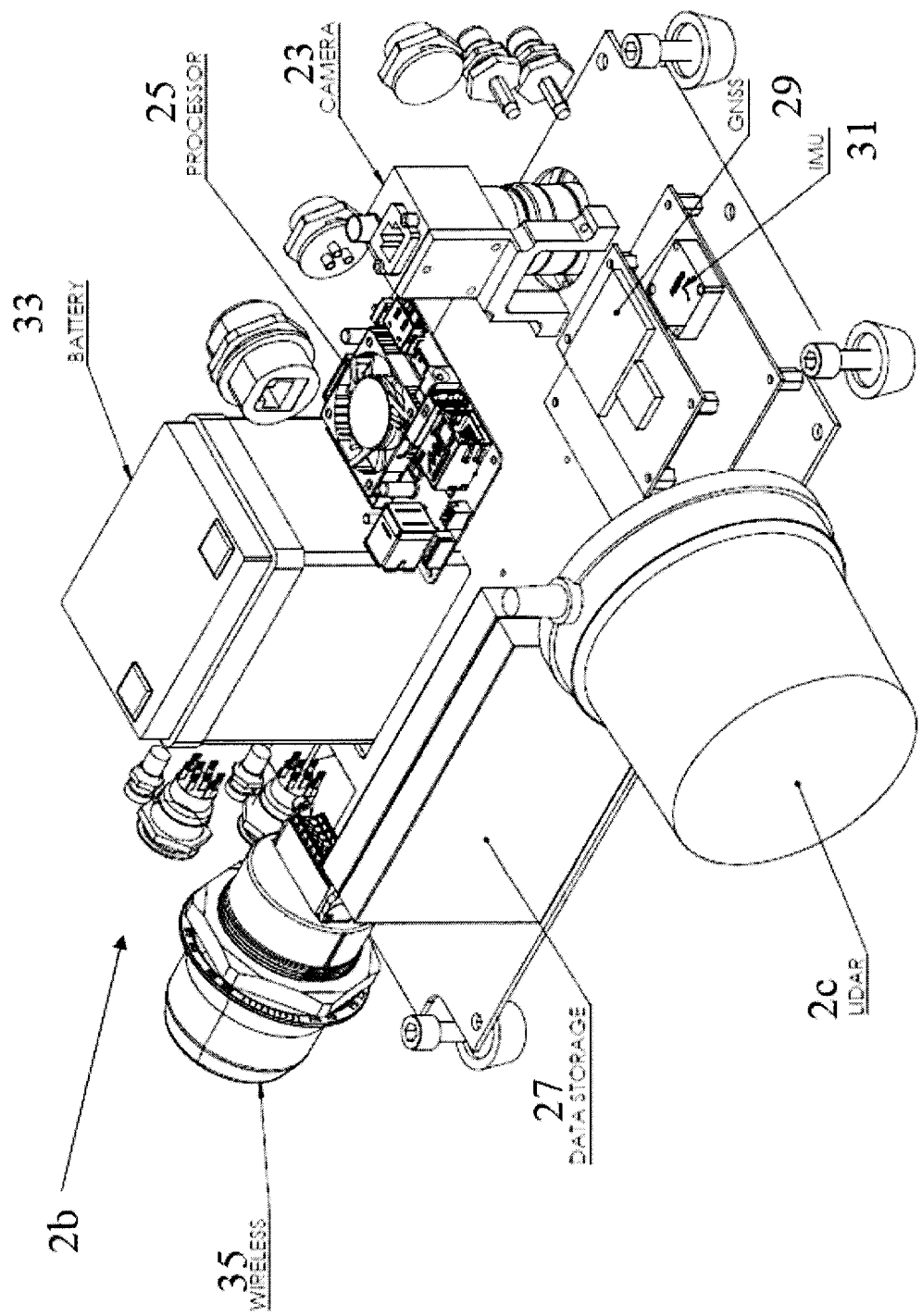
FIG. 2 shows a schematic representation of one embodiment of a system of the present invention.
Figure 3:
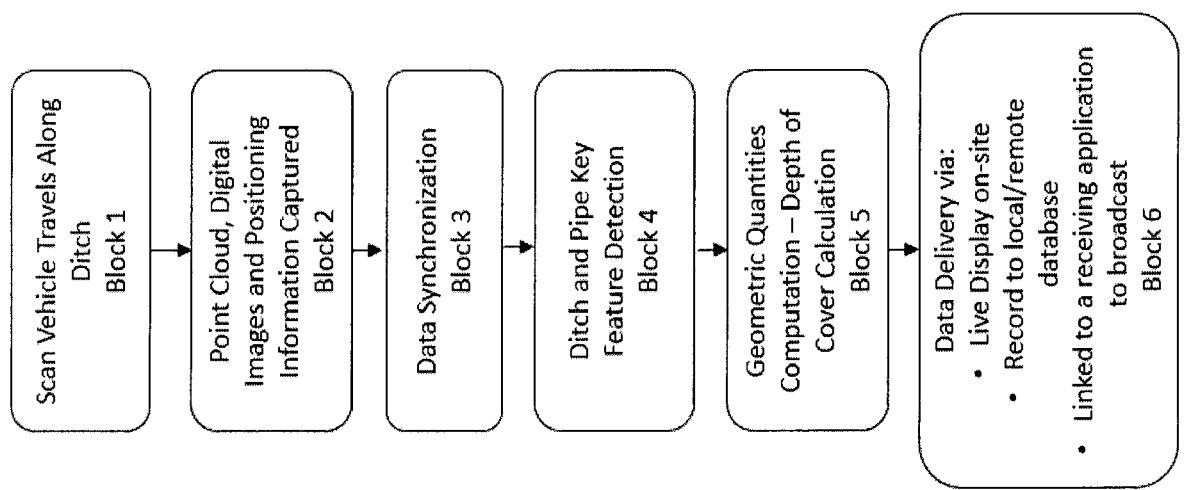
FIG. 3 shows a schematic flowchart of one embodiment of a method of the present invention.

FIG. 3 depicts a flowchart of an exemplary method for collecting and modelling data. In order to assist in the explanation of this example method, it will be assumed that it is performed using the system generally shown in FIGS. 1 and 2. However, it is to be understood that the described systems and methods can be varied, and need not work exactly as discussed herein in conjunction with each other, and that such variations are within the scope of present implementations. For example, according to some embodiments, various blocks may be performed in parallel rather than in sequence. It is understood that for the purpose of this application, the terms "step" and "steps" are used interchangeably with the terms "block" and "blocks", and as such that the use of the terms "step" and "steps" does not denote a particular sequence unless otherwise specified herein.

At block 1, the collection vehicle 1 trails pipe laying equipment at a distance suitable to ensure that pipe is in its final position within the trench. A ranging device is mounted such that it is above the laid pipe and has a clear view of the trench profile as well as the pipe itself. Preferably, the collection vehicle travels essentially at the same speed as the pipe laying equipment. As the vehicle travels alongside the pipe (or in another suitable path), the collection platform, including the scanner and RGB camera, scans the laid pipe, ditch profile, and site in general. The scan and data acquisition may be continuous, or may proceed in batches in specific locations.

At block 2, the collected lidar data is inputted into the onboard processing engine which comprises, for example, the above described at least one processor and memory device.

At block 3, the collected lidar data, comprising data from the scanner and the RGB camera, are synchronized as is well known in the art.

At block 4, the processing engine detects the pipe profile, the ditch profile and key points at the ditch bottom edge on either side of the pipe. In some embodiments, this is accomplished by an edge detection algorithm based on grayscale variation. The pipe profile may be detected, in some embodiments, by nearest neighbor search method based on the known diameter of the pipe. The top edge of the ditch is identified as the point at which the slope decreases abruptly from surrounding terrain to the ditch wall.

At block 5, the depth-of-cover (DOC) is calculated once one or both of the two ditch top edges corresponding to that station are determined, as well as the pipe centreline. The DOC value may also be tagged at block 5 with a time, an absolute position (from the GNSS system), and, optionally, an image of the pipe at that point.

At block 6, optionally, the 2-dimensional (2D) scanned profile is also stored as well as any other relevant information such as the presence of a weld. This information forms a single DOC station. As the vehicle moves, additional stations are created. Each station may be stored and/or delivered via one or more the following mechanisms: live display on-site, recorded to a local or remote database, linked in real time to a receiving application allowing for a number of viewers to log in and monitor real-time or near-real-time data, as well as view and retrieve historical data. At least a portion of this information may be displayed via a GUI, such as GUI 40, generated by a display/report module (which stores, displays, reports and/or communicates a record of the at least one geometric feature correlated to the pipeline construction position).

Figure 4:
FIG. 4 shows a point cloud from which a grayscale digital elevation model image is produced.

In some embodiments, the method may comprise variations of the basic steps or tasks. As illustrated schematically in FIG. 3, acquisition of point cloud data with associated geo-tag information proceeds as above. FIG. 4 shows a grayscale point cloud image produced by a lidar data collection device. In one embodiment, the point cloud is processed to produce a digital elevation model of the ditch and pipe, which may comprise a grayscale image with elevation information. At least one 2D geometric feature is extracted from the digital elevation model. In one embodiment, the 2D geometric feature comprises a linear contour representative of the pipe centreline (the highest point of the pipe, assuming a cylindrical shape), one or both bottom edges of the ditch, and one or both upper edges of the ditch. It may be necessary or desirable to apply a digital filter to the feature extraction data, to remove noise and/or to increase contrast of the desired geometric features.

Figure 5:
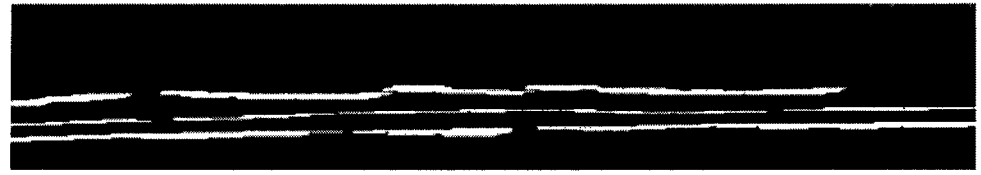
FIG. 5 shows a grayscale digital elevation model for a length of a ditch, and the results of linear contour detection before and after noise filtering.
Figure 5:
Figure 5:
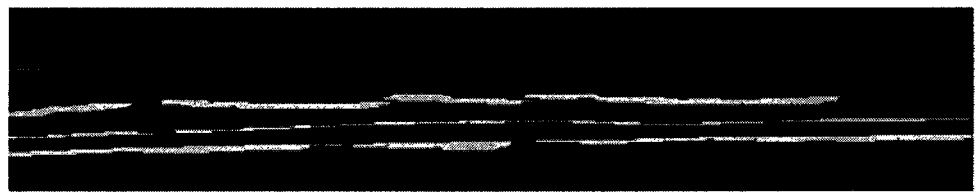
Figure 5:

In the 2D feature extraction step, vertical lines are extracted from the grayscale digital elevation model through morphology operations, which would result in the detection of multiple lines as shown by the centre image in FIG. 5. In order to keep only the features of interest (lines depicting the two bottom edges and the pipeline side) and discard small lines (noise), a clustering method may be applied, where visible lines are grouped together based on the Euclidean distance of their points. The most connected lines may form a significant lines group, and deemed to hold the features of interest (feature smoothing).

Figures 6, 7:
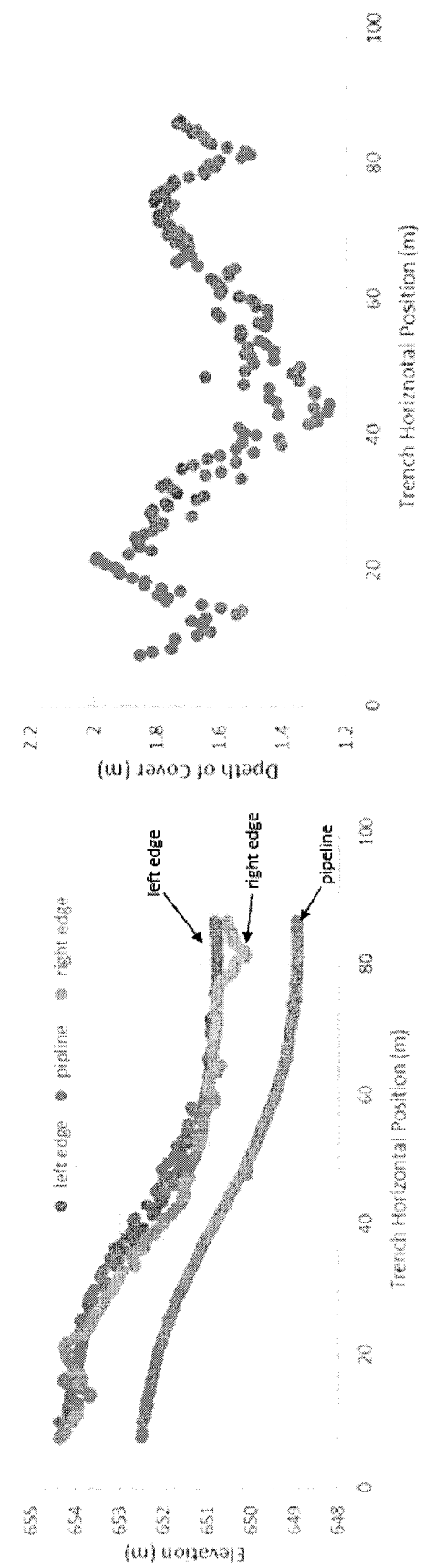
FIG. 6 shows a graph where elevation of the ditch edges and top of a pipe within the ditch has been determined for a plurality of positions along a longitudinal length of the ditch.
FIG. 7 shows the calculated depth-of-cover for the results of FIG. 6.

As shown in FIGS. 6 and 7, the elevation information associated with each of the linear contour of both upper edges and the pipe centreline in the ditch permits the calculation of the DOC for a number of longitudinal positions (stations) along the ditch. The DOC may be then be displayed immediately upon calculation and/or stored in a database onsite or in a remote location.

The generation of a digital elevation model followed by two-dimensional feature extraction is preferably applied in a post-processing application, where batches (or a continuous stream) of lidar point cloud data, tagged with geographic location, can be processed. Alternatively, the method may be used continuously in a near-real-time method, after at least a few meters of pipeline lidar data has been collected. The algorithm may then continue to compute DOC longitudinally along the ditch, as more lidar data is continually fed to the algorithm. This algorithm continuously lags the forward edge of data collection as the data from the previous few meters is processed.

As used herein, "near real-time" refers to the time delay introduced by data processing and/or network transmission, between the collection of data and the use of the processed data, such as for display, or feedback and control purposes. A real-time system may be described as one in which data may be received or collected, processed, in the order of less than a second (milliseconds or microseconds), while a near-real-time response may in the order of a few seconds.

In an alternative embodiment, a method may comprise an algorithm which provides for faster results, which may be in real-time or closer to real-time, in which the lidar point cloud data is processed by applying a raster transformation to produce a raster dataset. In some embodiments, the raster dataset, for an epoch, may be used to generate (a) slope maps and/or (b) elevation maps, although such maps are not necessary. For example, an elevation map comprises an elevation line of each of a plurality of points in a transverse plane which intersects a longitudinal axis of the ditch. Feature extraction from the raster dataset may comprise the identification of the points which represent significant features.

In one example, the raster method creates a consistent grid and then uses a kernel to interpret that grid and create a slope value consistently along that raster. The term "slope" may be mathematically defined as the approximate first derivative between two points in 2D space. However, the raster that is set up may be inconsistent with varying size of the point cloud and the range values it contains, and is a two-dimensional calculation. Further, it can only be two-dimensional along the path traveled. When using a slope calculation, the data is generalized to make a quick calculation.

In some embodiments, break lines may be used to identify geometric features. Break lines are longitudinal elements determined to represent edges, where abrupt changes of slope occur. Break lines inherently align to the size of the point cloud and the ranges and accuracy of the point cloud and may therefore a better representation of discrete measurements aggregated into a line. As is known to those skilled in the art, there are hard break lines, which denote a major change in elevation such as the lip of a damn, or road edge, and maybe top of slope in a ditch. Hard break lines are essentially sharp edges. It may be preferred to use soft break lines, which retain the x,y,z values of all vertices along the path, which hard break lines do not. Generally, the top of most ditches are not sharp edges, they are inflection points of rapidly changing slope, which are interpreted at various ranges and geometries to find the actually point of change. This allows for the determination of "top edges for ditches for ditches which have soft drop-offs and not steep slopes from top to bottom. A further advantage of using soft break lines is that accurate x,y,z values are maintained, avoiding the need to infer a location.

Figure 8A:
FIG. 8A shows a graph of elevation plotted against lateral position across a ditch with a pipe laying at the bottom.

For example, a row of raster dataset derived elevation profile is shown in FIG. 8A, which shows elevation along a plane which is transverse to the longitudinal axis of the pipeline ditch. As such, it is substantially a transverse cross-sectional profile of the ditch. In this case, the left edge of the ditch is that point at the left edge of the graph where the slope of the line starts to decrease significantly (L). The top of the pipeline is the highest elevation of the object at the bottom of the ditch (P). The right edge of the ditch is where the slope of the line flattens out (R). Accordingly, DOC may be readily calculated for each elevation profile.

Figure 8B:
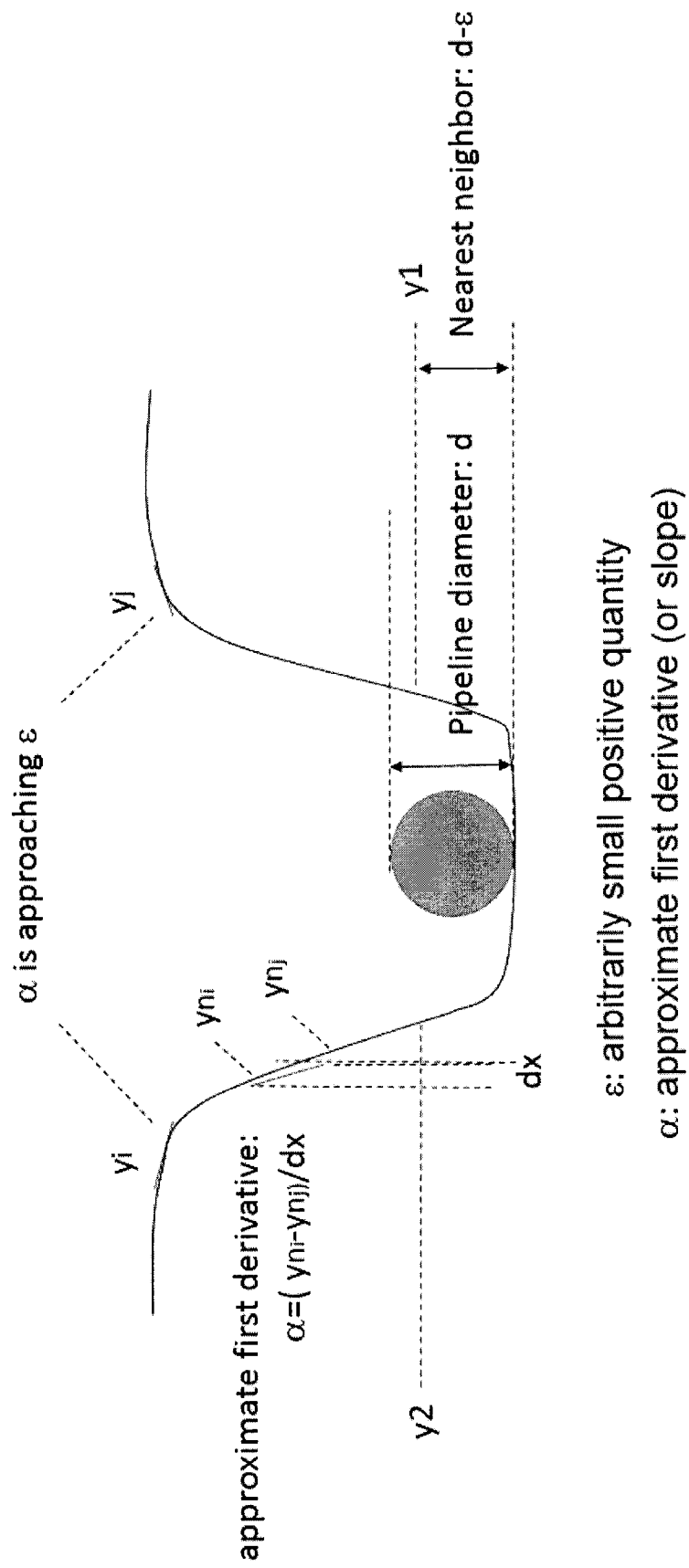
FIG. 8B shows a two-dimensional profile of a scanned area at a pipeline construction location, derived from a rasterized dataset.

In some embodiments, as illustrated schematically in FIG. 8B, the DOC value may be calculated based on a nearest-neighbor method. The pipeline diameter, d, is known and introduced. The nearest neighbor based on elevation in the ditch (d-ε) may then be found.

Two points on the opposite side of the pipeline with values close to d-ε, y1 and y2, are then chosen, and the highest elevation between y1 and y2 is then found, which is deemed to be the top of the pipe. In the next step, the approximate first derivative for one or both ditch walls is calculated, $\alpha=(Yn1-Yn2)/dx$. The two points on the opposite shoulders of the ditch, Yi and Yj, which are located where "α" approaches the threshold "ε", are deemed to be the top edge corners. In this example, DOC is calculated as the difference in elevation between d and a line connecting Yi and Yj.

Figure 9:
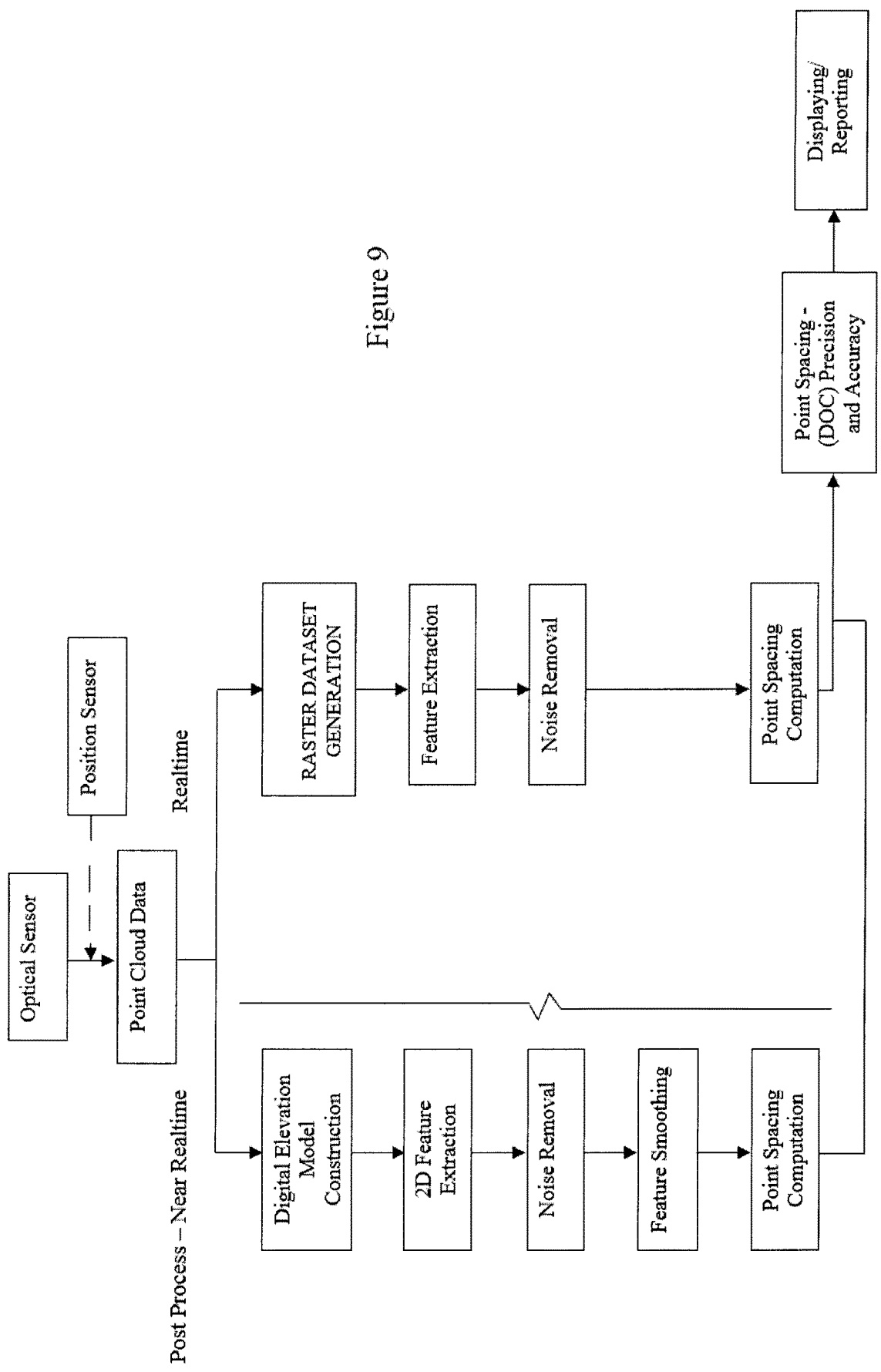
FIG. 9 shows a schematic flowchart of an embodiment of the present invention, providing both a real-time and near-real time method in parallel.

In one embodiment, the point cloud is processed to produce a 2D digital elevation model and a raster dataset, wherein the raster dataset is used to determine the at least one geometric feature substantially in real-time and the digital elevation model is used to determine the at least one geometric feature in near-real-time, where both determinations are processed in parallel, as shown schematically in FIG. 9. The two determinations may be checked against each other for each location, and used to improve the overall accuracy of the determination.

Figure 10:
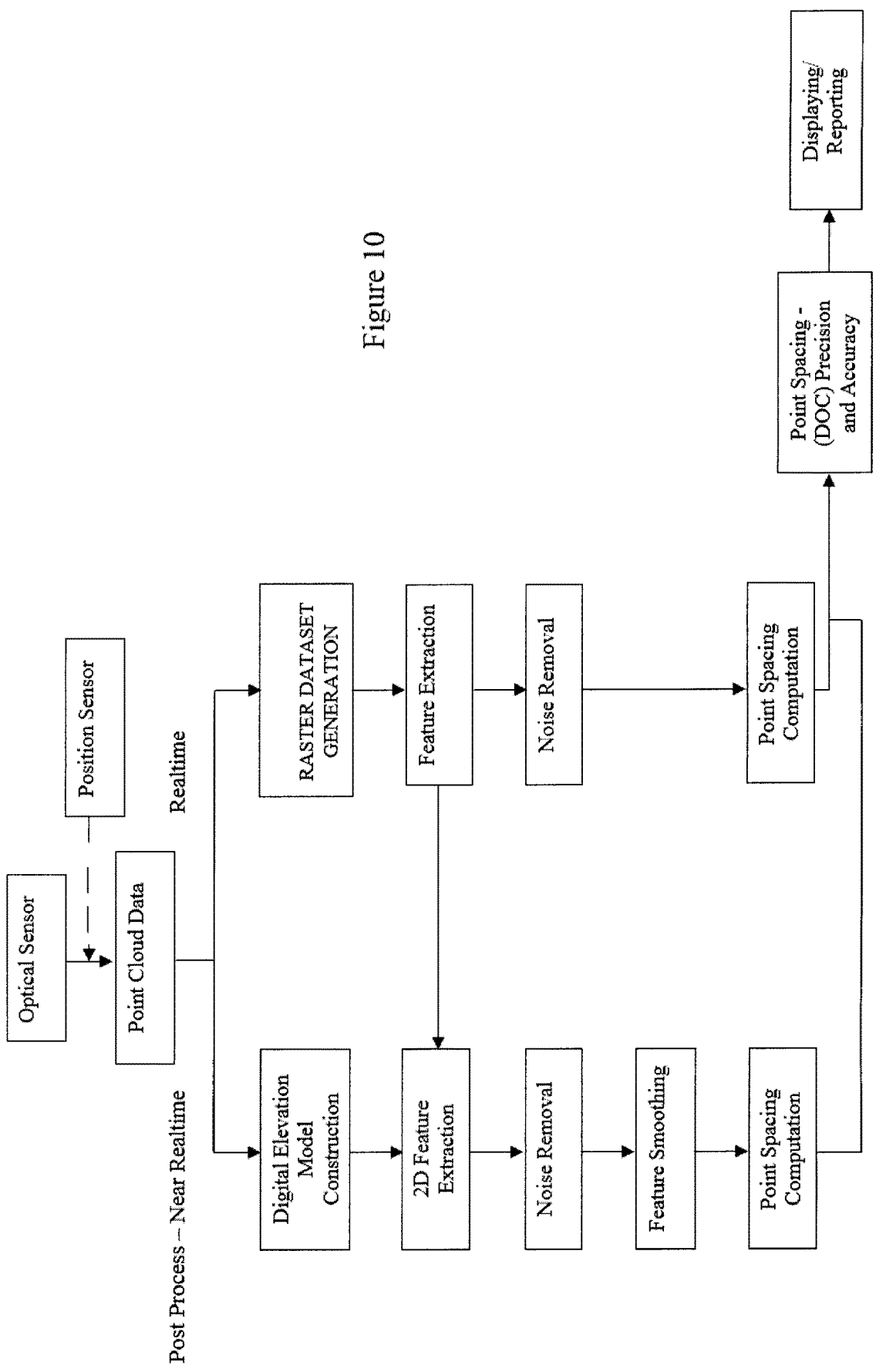
FIG. 10 shows a schematic flowchart of another embodiment, where two different methods of feature extraction may be combined.

In some embodiments, the two methods may be merged or share information at an intermediate stage. For example, as shown in FIG. 10, a raster dataset derived elevation map and slope map may be used to determine the location of one feature, while the digital elevation model may be used to determine the location of another feature. Thus, the former may be used to determine the location of the pipe, while the latter may be used to determine the location of the upper edges of the ditch. This combination of methods may be particularly useful in scenarios where unambiguous feature extraction is difficult in either or both methods. One example of such a scenario is where two or more pipes, of the same size, are placed in the same ditch. Linear contour detection of the pipes using a digital elevation model may be difficult, but the ditch edges may be readily identified. The rasterized dataset may then be used to determine elevation of each of the pipes, which information is then combined. However, with two or more pipes, of different sizes, both methods may fail to identify the elevation of each of the pipes. In such cases, a 3D cylinder model fitting to determine each of the pipes key features maybe used.

Using a high definition LiDAR unit, and having it at NADIR, as performed in some embodiments described herein, in close proximity to the target may result in very high definition. Also, in some embodiments, since the mobile platform would be moving very slowly, more data points are collected and there is usually a low level of environmental error introduced that needs to be accounted for. These points contrast favourably with competing technology, such as using a drone with a LiDAR device.

Overall, some of the technical advantages of the Applicants' system and methods, in at least some embodiments, may include: high accuracy models and georeferenced images of foreign pipeline crossings, high accuracy models and georeferenced images of pipeline appurtenances such as cathodic protection cadwelds, rectifier tie-ins, swamp weights, sand bags, footings, etc., high accuracy models and georeferenced images of complex tie-in locations and bores, high accuracy models and georeferenced images of non-conformance events.

Interpretation.

Aspects of the present invention may be described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Those skilled in the art will appreciate that in some implementations, the functionality of the described systems, and components, can be implemented using pre-programmed hardware or firmware elements (e.g., application specific integrated circuits (ASICs), electrically erasable programmable read-only memories (EEPROMs), etc.), or other related components. In other implementations, the functionality of the described systems, and components, can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Furthermore, it is appreciated that the computer-readable program can be stored as a computer program product comprising a computer usable medium. Further, a persistent storage device can comprise the computer readable program code. It is yet further appreciated that the computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or steps plus function elements in the claims appended to this specification are intended to include any structure, material, or act for performing the function in combination with other claimed elements as specifically claimed.

References in the specification to "one embodiment", "an embodiment", etc., indicate that the embodiment described may include a particular aspect, feature, structure, or characteristic, but not every embodiment necessarily includes that aspect, feature, structure, or characteristic. Moreover, such phrases may, but do not necessarily, refer to the same embodiment referred to in other portions of the specification. Further, when a particular aspect, feature, structure, or characteristic is described in connection with an embodiment, it is within the knowledge of one skilled in the art to affect or connect such module, aspect, feature, structure, or characteristic with other embodiments, whether or not explicitly described. In other words, any module, element or feature may be combined with any other element or feature in different embodiments, unless there is an obvious or inherent incompatibility, or it is specifically excluded.

It is further noted that the claims may be drafted to exclude any optional element. As such, this statement is intended to serve as antecedent basis for the use of exclusive terminology, such as "solely," "only," and the like, in connection with the recitation of claim elements or use of a "negative" limitation. The terms "preferably," "preferred," "prefer," "optionally," "may," and similar terms are used to indicate that an item, condition or step being referred to is an optional (not required) feature of the invention.

The singular forms "a," "an," and "the" include the plural reference unless the context clearly dictates otherwise. The term "and/or" means any one of the items, any combination of the items, or all of the items with which this term is associated. The phrase "one or more" is readily understood by one of skill in the art, particularly when read in context of its usage.

The term "about" can refer to a variation of ±5%, ±10%, ±20%, or ±25% of the value specified. For example, "about 50" percent can in some embodiments carry a variation from 45 to 55 percent. For integer ranges, the term "about" can include one or two integers greater than and/or less than a recited integer at each end of the range. Unless indicated otherwise herein, the term "about" is intended to include values and ranges proximate to the recited range that are equivalent in terms of the functionality of the composition, or the embodiment.

As will be understood by one skilled in the art, for any and all purposes, particularly in terms of providing a written description, all ranges recited herein also encompass any and all possible sub-ranges and combinations of sub-ranges thereof, as well as the individual values making up the range, particularly integer values. A recited range includes each specific value, integer, decimal, or identity within the range. Any listed range can be easily recognized as sufficiently describing and enabling the same range being broken down into at least equal halves, thirds, quarters, fifths, or tenths. As a non-limiting example, each range discussed herein can be readily broken down into a lower third, middle third and upper third, etc.

As will also be understood by one skilled in the art, all language such as "up to", "at least", "greater than", "less than", "more than", "or more", and the like, include the number recited and such terms refer to ranges that can be subsequently broken down into sub-ranges as discussed above. In the same manner, all ratios recited herein also include all sub-ratios falling within the broader ratio.

The invention claimed is:

1. A method of modelling pipeline construction, comprising the steps of:
   (a) obtaining ranging data of a pipeline construction location including a pipe;
   (b) processing the ranging data to produce a spatially organized point cloud, wherein the point cloud contains absolute or relative geolocation information;
   (c) processing the point cloud to identify at least one geometric feature comprising a point or a two-dimensional feature representative of a pipe centreline, and associating the at least one geometric feature with the pipeline construction location; and
   (d) calculating depth-of-cover (DOC);
   wherein a DOC value is tagged with the pipeline construction location and is displayed or stored in real-time or near-real-time to ranging data acquisition.

2. The method of claim 1 wherein the ranging data is obtained by positioning a lidar device directly above the pipe.

3. The method of claim 1 wherein the pipeline construction location is identified with Global Navigation Satellite System (GNSS) data.

4. The method of claim 1 wherein the pipeline construction is underground construction and the pipe laid down in a ditch having at least one top edge and at least one bottom edge.

5. The method of claim 4 wherein the at least one geometric feature further comprises one or both top edges, and/or one or both bottom edges of the ditch.

6. The method of claim 1 wherein the point cloud is processed to produce a digital elevation model of the pipeline construction location, from which a two-dimensional feature representative of a pipe centreline is identified.

7. The method of claim 1 wherein the point cloud is processed to produce a rasterized dataset, from which a point representative of a pipe centreline and a point representative of one or both top edges is identified by determining break lines.

8. The method of claim 7 wherein the break lines are soft break lines.

9. The method of claim 8 wherein the determination of DOC is accomplished by using a rasterized dataset and separately using a digital elevation model, and one determination is used to confirm or refine the other determination.

10. The method of claim 1 wherein the at least one geometric feature is determined in real-time or near-real-time to ranging data acquisition.

11. The method of claim 10 wherein the at least one geometric feature is determined in real-time and also in near-real-time.

12. The method of claim 6 further comprising a noise filtering step before identifying the two-dimensional feature.

13. The method of claim 12 wherein the noise filtering step comprises a clustering step to discard noise.

14. A computer-implemented system for determining at least one geometric feature of a pipeline construction location, the system configured to receive ranging data from at least one ranging unit configured to be positioned above the pipeline construction location, the system comprising a processor and at least one memory device in communication with the processor, the memory comprising processor-executable instructions to (a) process the ranging data to produce a spatially organized point cloud, wherein the point cloud contains absolute or relative geolocation information; (b) extract the at least one geometric feature which comprises a point or two-dimensional linear contour representative of a pipeline centreline, from the point cloud and (c) calculate depth-of-cover (DOC), wherein a DOC value is tagged with the pipeline construction location and for display or storage in real-time or near-real-time to ranging data acquisition.

15. The system of claim 14 further comprising a ground-based mobile platform comprising a boom configured to position a ranging unit above the pipeline construction location.

16. The system of claim 14 wherein the ranging unit is a lidar unit.

17. The system of claim 14 further comprising a display/report module which stores, displays, reports and/or communicates a record of the at least one geometric feature correlated to the pipeline construction position.

* * * * *